United States Patent [19]
Fernando

[11] Patent Number: 5,805,489
[45] Date of Patent: Sep. 8, 1998

[54] DIGITAL MICROPROCESSOR DEVICE HAVING VARIABLE-DELAY DIVISION HARDWARE

[75] Inventor: John Susantha Fernando, Coopersburg, Pa.

[73] Assignee: Lucent Technologies Inc., Murray Hill, N.J.

[21] Appl. No.: 646,178

[22] Filed: May 7, 1996

[51] Int. Cl.$^6$ ..................................................... G06F 7/52
[52] U.S. Cl. ............................................................ 364/766
[58] Field of Search ................................... 364/761, 762, 364/764, 766, 767

[56] References Cited

U.S. PATENT DOCUMENTS

| | | | |
|---|---|---|---|
| 5,097,435 | 3/1992 | Takahashi | 364/766 |
| 5,301,139 | 4/1994 | Zinger | 364/767 |
| 5,493,523 | 2/1996 | Huffman | 364/766 |

Primary Examiner—Chuong Dinh Ngo

[57] ABSTRACT

The present invention is a variable-delay division (VDD) scheme implementable in hardware to execute signed and unsigned integer division and remainder operations in digital processor. The VDD scheme advantageously uses hardware utilized for multiplication to implement a 2-bits/cycle alignment step to iteratively align the divisor with the dividend. This speeds up the alignment phase of integer division. Quotient bits are produced at the rate of 1-bit/cycle using the well-known restoring scheme. For 32-bit 2's complement operands, the scheme has a delay less than a fixed-delay scheme for most operands.

32 Claims, 8 Drawing Sheets

DIGITAL MICROPROCESSOR DEVICE HAVING VARIABLE-DELAY DIVISION HARDWARE

FIELD OF THE INVENTION

The present invention relates generally to digital microprocessor devices, and more particularly to a scheme for efficient hardware implementation of division in such devices.

BACKGROUND OF THE INVENTION

Digital processors including microprocessors, microcontrollers and digital signal processors are well-known control devices used in many consumer and non-consumer applications. Of the basic arithmetic operations commonly performed by a digital processor, integer division is the most complex operation to implement in hardware. Hardware implementation of a division algorithm is required to support quotient and remainder computations with reasonable delay. Several choices are available for implementation of such division algorithms. For example, pure software methods take over a hundred cycles to complete a typical division operation, software methods assisted by hardware that implement only the basic division step, and pure hardware schemes that produce 1-quotient bit/cycle, 2-quotient bits/cycle or even more. As would be understood by a person skilled in the art, faster division schemes require more hardware. Since division is a relatively infrequent operation, a suitable compromise must be made.

Algorithms for division have been well researched and documented, and are well known to those skilled in the art. In general, integer division has two phases, alignment and quotient computation. Each phase is usually implemented in an iterative fashion (i.e. a sequence of identical steps, with each step taking a cycle). Division may be categorized as fixed-delay or variable-delay. For example, several microprocessors in the prior art use a common fixed-delay scheme for 32-bit operands which takes about 40 cycles. Variable-delay schemes are far less common and limited to software methods. The advantage of variable-delay is that the delay for relatively small quotients is much less than for fixed-delay schemes. Conversely, the delay for extreme cases is much larger than in the fixed-delay case. Thus, a variable-delay scheme is attractive if the quotients are known to be small, as in some embedded applications, or if the worst-case delay is not so large as to make the average time worse than the fixed-delay scheme. As discussed above, variable delay schemes are relatively slow, since they are primarily implemented in software. Accordingly, there is a need for a variable delay division scheme implemented in hardware that improves average computation performance without a significant increase in hardware.

SUMMARY OF THE INVENTION

The present invention is a variable-delay division (VDD) scheme to execute signed and unsigned integer division and remainder operations in a digital processor. The VDD scheme advantageously uses hardware utilized for multiplication to implement an alignment step to iteratively align the divisor with the dividend. This speeds up the alignment phase of integer division. Quotient bits may be produced using the well-known restoring scheme.

One embodiment of the present invention includes, a first register for loading a dividend value therein, a second register for loading a divisor value therein, and a third register including an extension at the most significant bits thereof, the third register and the extension define an extended register, and the third register is loaded with a zero value and the extension is presettable to include a predetermined marker value. A control means is coupled to the first, second and third register, and performs alignment of the divisor in the second register with the dividend in the first register through shifts of the second register. The extended register tracks the shifts of the second register during the alignment performing equal shifts in an opposite direction thereof. The positioning of the marker subsequent to said alignment is indicative of the number of iterations required to produce a desired quotient or remainder for a given dividend and divisor value. The control means is also operable to monitor the position of the marker subsequent to the alignment, where presence of the marker at a least significant bit position of the extended register is indicative of dividing a large value by 1 or −1, which causes a worst case delay during a division operation. In this case, the control means is operable to recognize the worst case delay. By detecting this case, the control means does not perform subsequent iterations of a division algorithm, thereby reducing the worst case delay.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

Although the present invention is described with reference to a specific embodiment of a digital microprocessor, it would be understood that the variable delay integer division scheme of the present invention may be adapted for use with other digital processing devices having comparable hardware capabilities, including micro processors, microcontrollers and digital signal processors. In addition, the present invention variable delay division scheme may also be implementable in other computing devices for performing division computations, such as calculators and the like. All such variations are intended to be included within the scope of the present invention.

Figure 1:
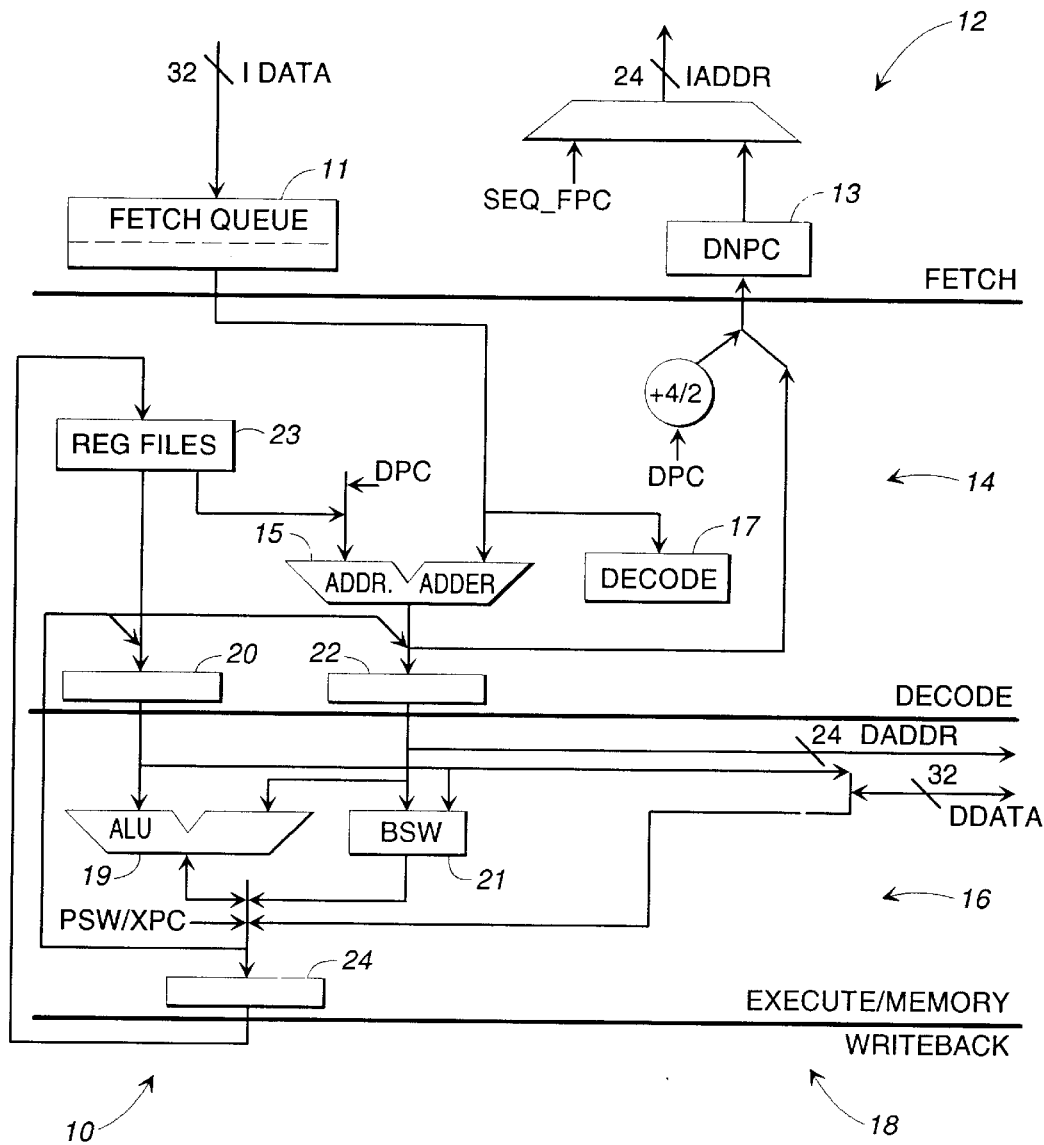
FIG. 1 shows one embodiment of processor pipeline as described in accordance with the present invention.

Referring to FIG. 1, there is shown one embodiment of a digital microprocessor 10 implementable in accordance with the present invention. As shown, the microprocessor 10 includes four pipeline stages: a fetch stage 12, decode stage 14, execute stage 16 and write-back 18. As shown, the fetch stage includes a fetch queue 11 and a program counter 13 and the decode stage 14 includes an address adder 15, decoding logic 17 and register files 23. The execute stage includes an ALU 19 and BSW (barrel switch) 21, as well as Left Operand (LOP) and Right Operand (ROP) registers 20, 22, respectively, and a Write Data (WDATA) register 24, to be described in greater detail herein. As would be understood by those skilled in the art, instructions to be executed on the processor are fetched or retrieved by means of hardware included in the fetch stage 12. The instructions are then decoded in the decode stage 14 and executed in an appropriate sequence in the execute stage 16. The writeback stage 18 operation takes what is present in the WDATA register 24 and places it back into the register files 23.

Figure 2:
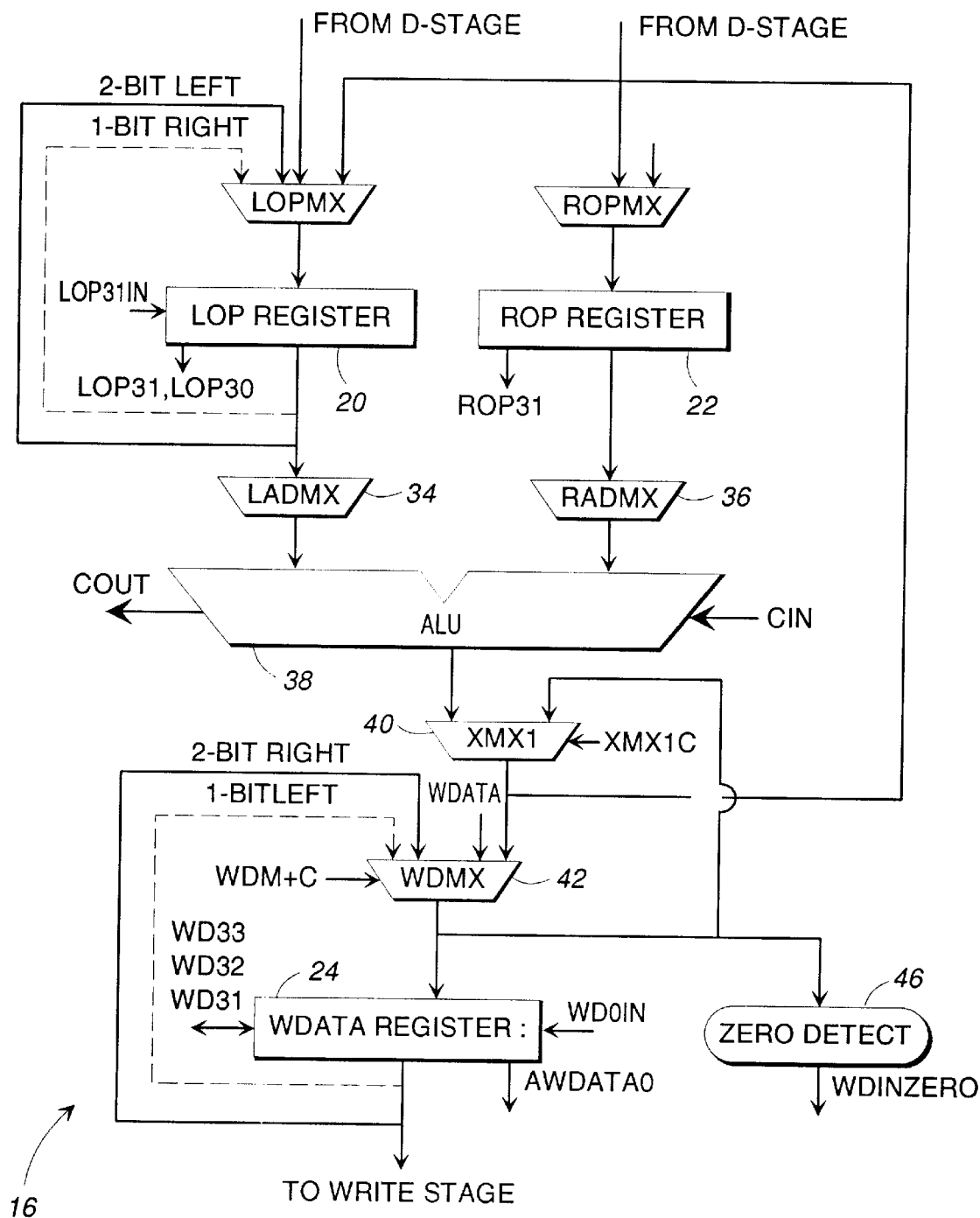
FIG. 2 shows the shows a more detailed illustration of the execute stage of a processor described in accordance with the present invention.

Referring to FIG. 2, a more detailed illustration of the execute stage 16 is shown, depicting the datapath of the microprocessor with the details relevant to division and multiplication operations. As shown, the execute stage 16 consists of components located between Left Operand (LOP) and Right Operand (ROP) registers 20, 22, respectively, and the Write Data (WDATA) register 24. The execute stage 16 accepts two 32-bit operands, stored in the LOP and ROP registers 20, 22, and writes the result of the operation executed into the WDATA register 24.

A Left Operand Multiplexer (LOPMX) 26 and Right Operand Multiplexer (ROPMX) 28 have outputs coupled to the input of the LOP register and the ROP register, respectively. The LOPMX 26 selects the value to be loaded into the LOP register based on control signals lopmxc (LOPMX control) which are present. Table 1 illustrates various control signals which may be input to the LOPMX. For example, selecting lopmxc=2blt allows the value in the LOP register to be shifted left by 2 bits on the next clock. This feature is required for multiplication, and is also exploited by the variable delay division (VDD) scheme, as will be described. Other control signal values include: lopmxc=1brt, which allows the value in the LOP register to be shifted right by 1 bit with the bit_31 (most significant) bit of the LOP register set to 0; lopmxc=dstg which signals to accept the left operand value from the decode stage; and lopmxc=xmx1, which signals to accept the output from the XMX1 multiplexer 40.

In a similar fashion to the LOPMX 26, the ROPMX 28 selects the value to be loaded into the ROP register based on the control signals ropmxc (ROPMX control). The control signals illustrated in FIG. 2 are defined in Table 2.

The LOP register 20 accepts input from the LOPMX 26 and stores it on the rising edge of the clock if a control signal ldlop=1. If ldlop=0, the value in LOP remains unchanged. Similarly, the right operand is taken from the output of ROPMX 28 and stored in the ROP register 22 on the rising edge of the clock if ldrop=1. In the shown embodiment, the LOP and ROP registers are 32-bit registers, however, as would be understood, these and other registers in the processor could be other sizes. The most significant bits of LOP and ROP (the leftmost bit, or the sign bit), lop31 and rop31, are also used for controlling division. During left shift, another input lop31in specifies the value of lop31.

The outputs of the Left Operand Register (LOP) 20 and Right Operand Register (ROP) 22 are coupled to a Left Adder Multiplexer (LADMX) 34 and Right Adder Multiplexer (RADMX) 36, respectively. LADMX and RADMX perform complementing, shifting and zeroing operations on the left and right inputs which are then input to the ALU (Arithmetic and Logic Unit) 38. These operations are defined in Table 3.

As would be understood, the 32-bit ALU 38 of the instant microprocessor performs addition, logical OR, logical AND, logical XOR, on the left and right operand. The operation is selected by specifying a control signal, for example, aluop to be add_op, or_op, and_op or xor_op. To allow subtraction cin (the carry into bit 0) may also be controlled. By specifying ladmxc, radmxc, cin and aluop appropriately, the ALU can perform LOP+ROP, LOP-ROP or ROP-LOP. The ALU 38 can also pass through either LOP or ROP without modification and can provide an output of zero to initialize WDATA to zero. The output cout is the carry out from bit_31 and is used to compute arithmetic overflow, and results of comparisons.

A XMX1 Multiplexer 40 is coupled to the output of the ALU 38. The XMX1 multiplexer 40 selects either the ALU output or the output of the Write data multiplexer WDMX 42 based on a control signal xmxlc. If xmxlc=alu the ALU output is selected and if xmxlc=wdmx, then the WDMX output is selected. The output of the XMX1 multiplexer is coupled to the LOPMX 26 and ROPMX 28 to allow bypassing (i.e., loading X-stage values directly from X_stage output without going via the write-back stage). Although not shown in FIG. 2, the memory and I/O data is also input via the XMX1.

The output of the XMX1 Multiplexer 40 is coupled to the WDMX (Write Data) Multiplexer 42. The WDMX multiplexer is controlled by a wdmxc control signal which selects an input as defined in Table 4. The WDMX 42 also facilitates shift operations on WDATA register 24.

The Write Data register 24 stores the 32-bit output of the execute stage. Bits 0,1 and 31 are also used for controlling the multiplication/division schemes. The WDATA register is connected to the input of the register file of the microprocessor (FIG. 1). Loading WDATA is done when a control signal ldwdata=1. During left shifts a separate input wd0in specifies the value of wd0.

The input to the WDATA register 24 is connected to a zero detector 46 which sets wdinzero=1 if the input is zero. A latched version of wdinzero is wdinzeroq, and it indicates the value of wdinzero in the previous clock.

Datapath for Multiplication and Variable-Delay Division

The present invention processor performs multiplication by implementing the well-known radix-4 modified Booth scheme. This scheme requires the 2-bit shift capability on LOP and WDATA registers 20, 24, as will be explained. Initially the multiplicand is in LOP 20 and the multiplier is in ROP 22. The multiplier is moved to WDATA 24 and ROP 22 is used to accumulate to partial product. The main iteration is as follows: wd1 and wd0 along with the previous value of wd1 are examined to determine the multiple (denoted by b) according to the modified Booth algorithm. Each cycle updates ROP with bxLOP+ROP, where b={-2, -1,0,1,2}. Each cycle also shifts LOP 2-bits left and WDATA 2-bits right to implement the radix-4 algorithm. It is this feature that the variable delay division (VDD) scheme exploits for alignment of dividend and divisor.

Figure 3:
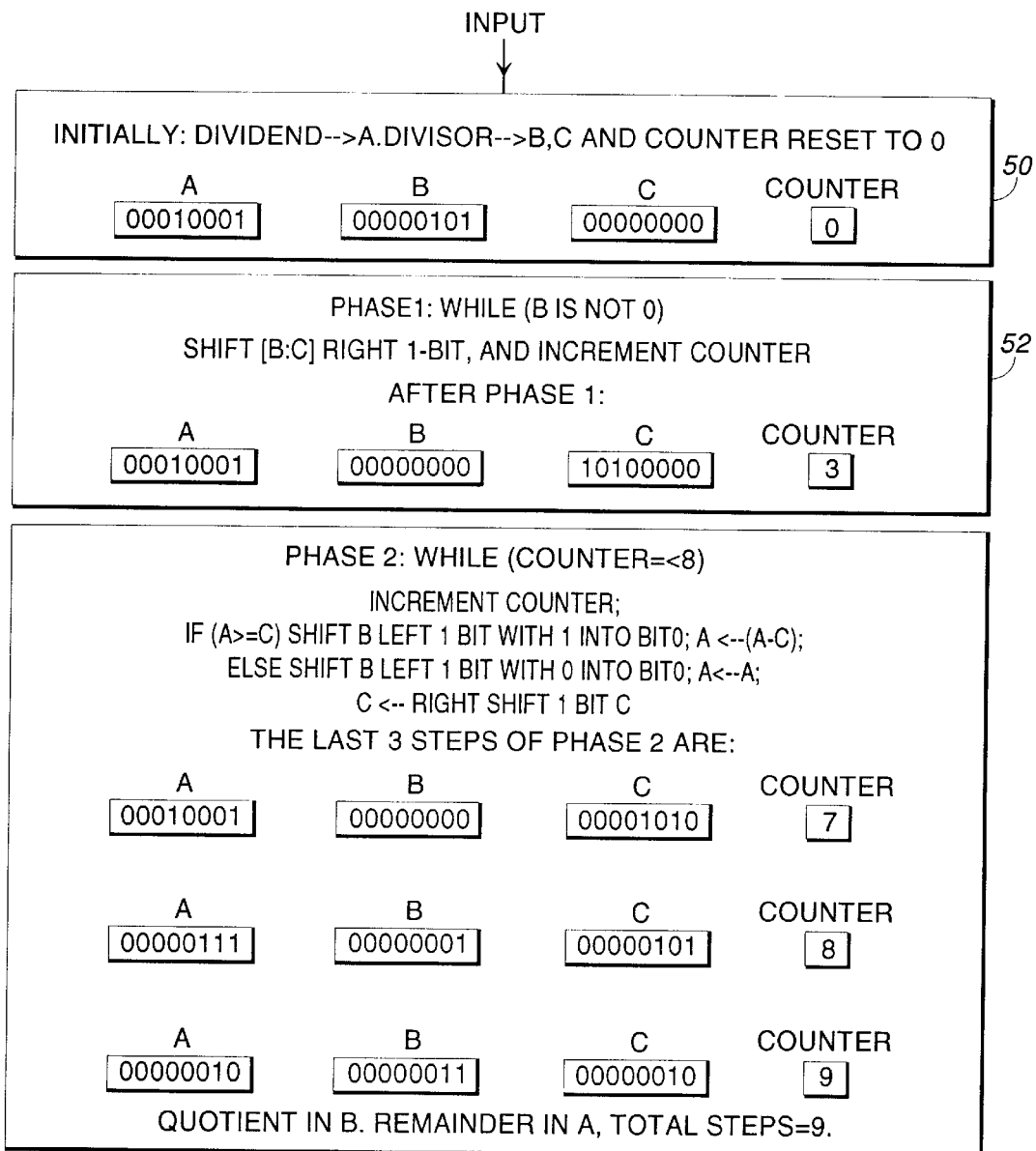
FIG. 3 shows one illustration of a prior art fixed delay division scheme.

In order to illustrate the advantages of the present invention variable delay division scheme, it is useful to first describe a division operation using a common fixed-delay scheme. FIG. 3 illustrates such a common fixed-delay scheme with an example of dividing 17 (the dividend) by 5 (the divisor). For simplicity of illustration, it is assumed that the registers A, B, and C are 8 bits each. The values in registers A,B,C are binary and the counter is in decimal. In box 50 the initialization procedure is illustrated, where the dividend is put in register A, the divisor is put in register B and C and counter are reset to 0. In Phase 1 (box 52), the value in B is shifted into C, 1-bit per step, until B is zero and C has the value in its upper bits. The counter keeps track of the number of steps. In Phase 2 (box 54), the well known restoring division algorithm is used as shown. When counter reaches 9, the quotient is found in register B and the remainder is in register A. Note that the alignment of the divisor with the dividend takes 7 steps (see values corresponding to counter=7), and producing the quotient bits takes 2 more. For all 8-bit positive values, the scheme takes a fixed number of clocks (9).

Figure 4:
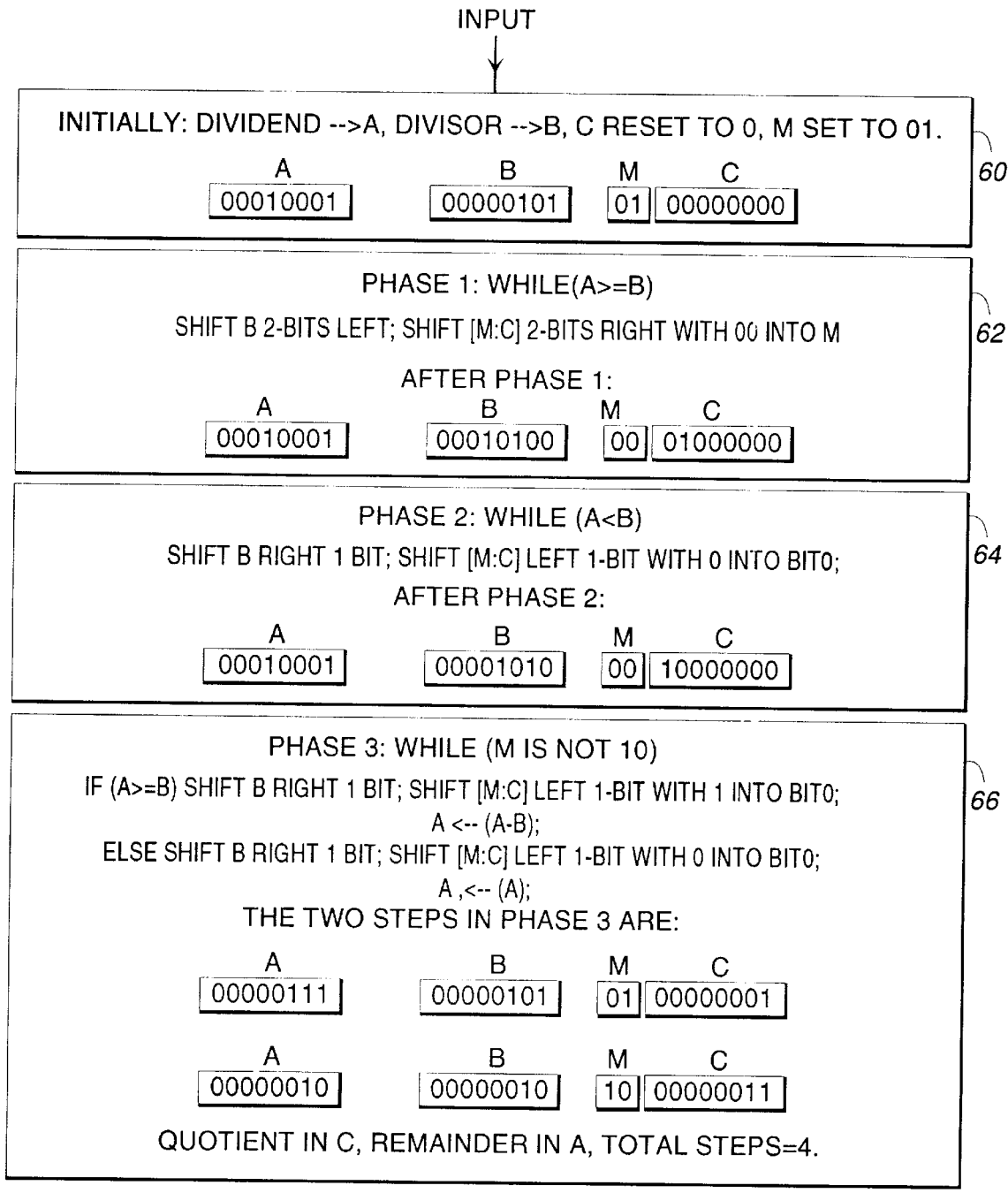
FIG. 4 shows one embodiment of a variable delay division scheme implemented in accordance with the present invention.

FIG. 4 illustrates the variable delay division scheme of the present invention for the identical division (17/5). The counter in the fixed-delay scheme has been replaced with 2 bits labeled m for marker, shown as an extension of register C. In the initialization procedure (box 60), m is set to 01, C=0 and the dividend and divisor are in registers A and B, respectively. In Phase 1 (box 62) of the variable delay division scheme, B is shifted 2-bits per step until it is larger than A. For each 2-bit shift in B, m:C is shifted 2-bits right, such that the 2 bits in m replace the 2 most significant bits in C. Thus the 1 is moved right, in 2-bit steps. This process may, however, leave B over-shifted and may require a correction before A and B are aligned (that is, alignment requires A >=B but 2B >A). Phase 2 (box 64) shows the right shift in B required for correction. Phase 2 will have either 1 or (at most) 2 steps. Phase 3 (box 66) is the usual restoring division algorithm. The division is complete when m=10, which in the case of FIG. 4 takes 4 steps or clock cycles.

As can be seen, the number of clocks taken is proportional to the number of quotient bits. For all dividends and divisors of 4 or fewer bits the VD scheme is faster than the fixed-delay scheme. For values of 5 or 6 bits the VD scheme takes a maximum of 10 steps, compared to 9 for fixed-delay. As would be understood, multiple shifts of greater than 2 bits may also be performed in order to speed the alignment, however, any shifts of greater than 2 bits would require shift capability to be added to the execute stage and may therefore not be considered practical.

In essence, the alignment phase of the above-described division methodology performs two functions: aligns the divisor with dividend, and provides a marker. The marker specifies how many iterations are required to produce the desired quotient or remainder for a given dividend and divisor. The marker is a bit value of 1 in the WDATA/ extension (wd32:wd31:WDATA) register where all but 1 bit is zero. Initially the 1 is one bit away from the left end (wd31=1). With every n-bit shift of the divisor, the 1 is shifted in the opposite direction by n bits, where in this implementation n=1 or 2. Thus, when alignment is done, the marker indicates how many shifts were performed to align the divisor. More importantly, it indicates how many quotient bits must be produced. The number of quotient bits that must be produced is the number of 1-bit shifts required to move the marker to the position (wd32=1). Thus, a very simple stopping condition is provided: produce quotient bits until wd32=1. Moreover, since each quotient bit is added by a 1-bit left shift of the extended WDATA register ([wd32:wd31:WDATA] register), the marker is self-adjusting, and requires no additional manipulation. The only additional hardware required to implement the marker are the two bits wd32:wd31. An additional advantage of the marker is in reducing the worst-case delay by three cycles.

Referring now to FIG. 2, it can be seen that implementing the VDD scheme on the processor of the present invention requires 1-bit right shift on LOP 20 and 1-bit left shift on WDATA 24. In contrast, the conventional division scheme would require left and right 1-bit shifts on both LOP and WDATA. Thus the VDD scheme requires fewer features in the datapath and the 2-bit shift capabilities are shared by multiplication and division.

The worst-case delay is incurred for dividing the largest numbers by 1 (or −1). For 32-bit numbers, consider the case when the dividend has the most significant bit set and all other bits are zero. The number of cycles taken to accomplish the division is 49: 16 (2-bit alignment shifts)+1(1-bit correction shift)+(quotient bit iterations). If this case can be identified, then no division steps are required to produce the result since quotient is identical to the dividend (sign may have to be adjusted) and remainder is zero. Identifying this case is very easy due to the marker. Again, consider the case of the most significant bit set in the dividend and a divisor of 1. After 16 shifts of 2-bits each, the marker ends up at WDATA0. WDATA0 is a bit that is used as an input for the booth multiple in multiplication. Thus, simply monitoring this bit during alignment, identifies the desired condition and also the case when the divisor =−2. To eliminate the latter requires using the condition that the bit to the left of the most significant bit of the shifted divisor is 1. Thus a simple condition that uses the marker and another bit identifies the case of dividing a class of numbers by 1. The class of numbers having a worst case delay includes those with magnitudes larger than 2**30. This reduces the worst-case delay by 3 cycles. To compose the required result requires 1 more state (DIV8), as will be described.

Division State Machine

Figure 5:
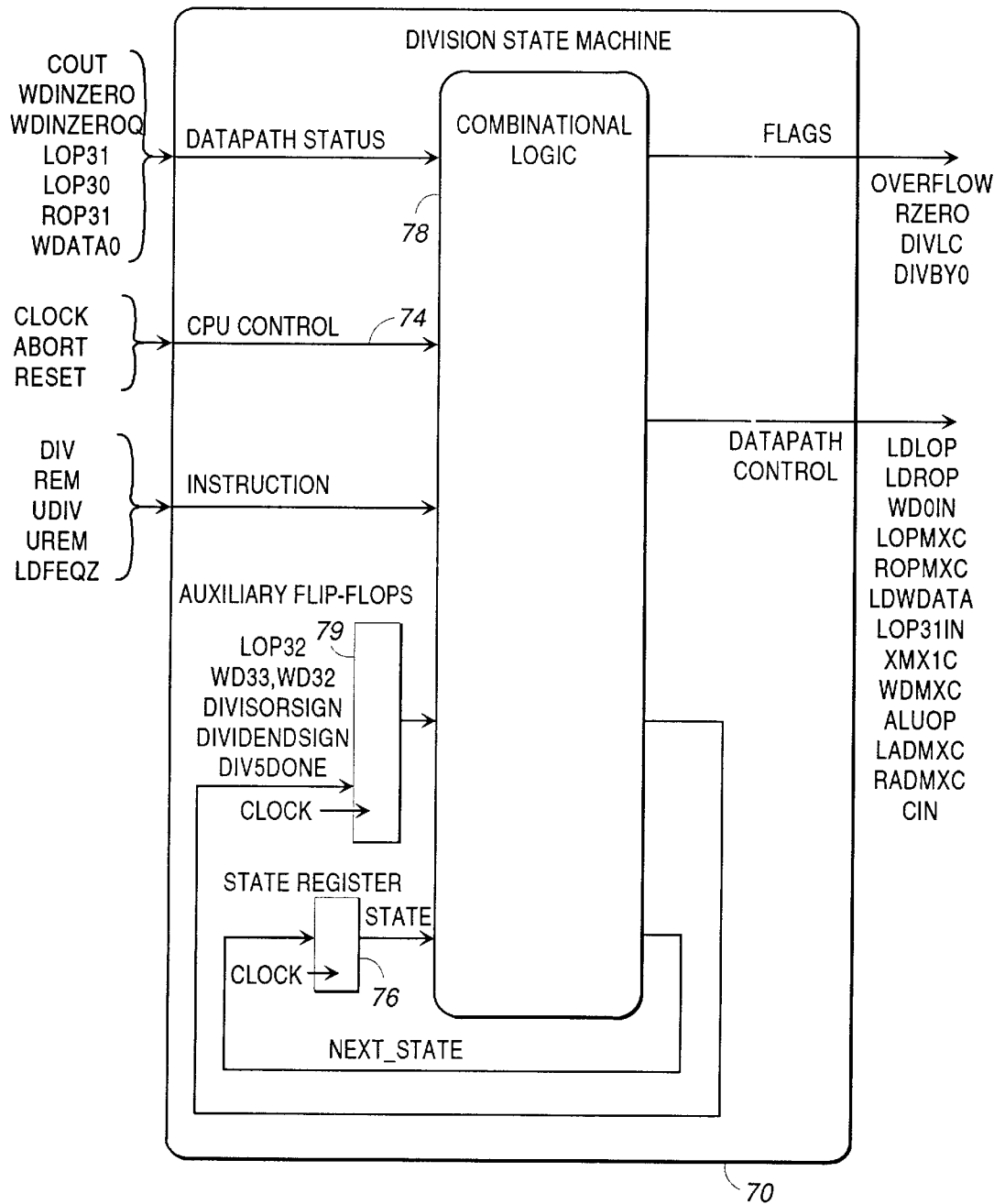
FIG. 5 shows one embodiment of a state machine for implementing the variable delay division scheme of the present invention.
Figure 6:
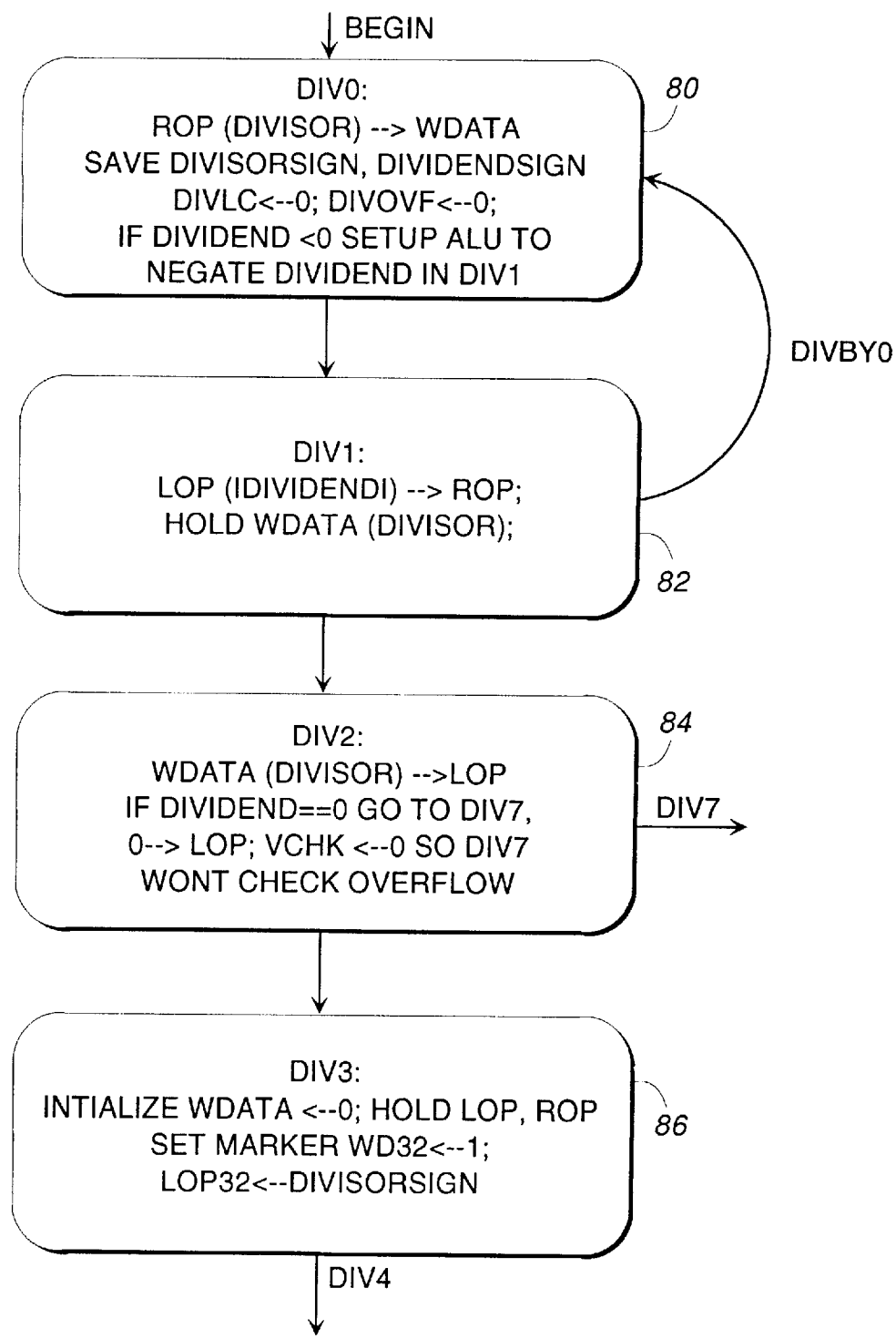
FIG. 6, 7 and 8 show an exemplary state diagram for the state machine of FIG. 5.
Figure 7:
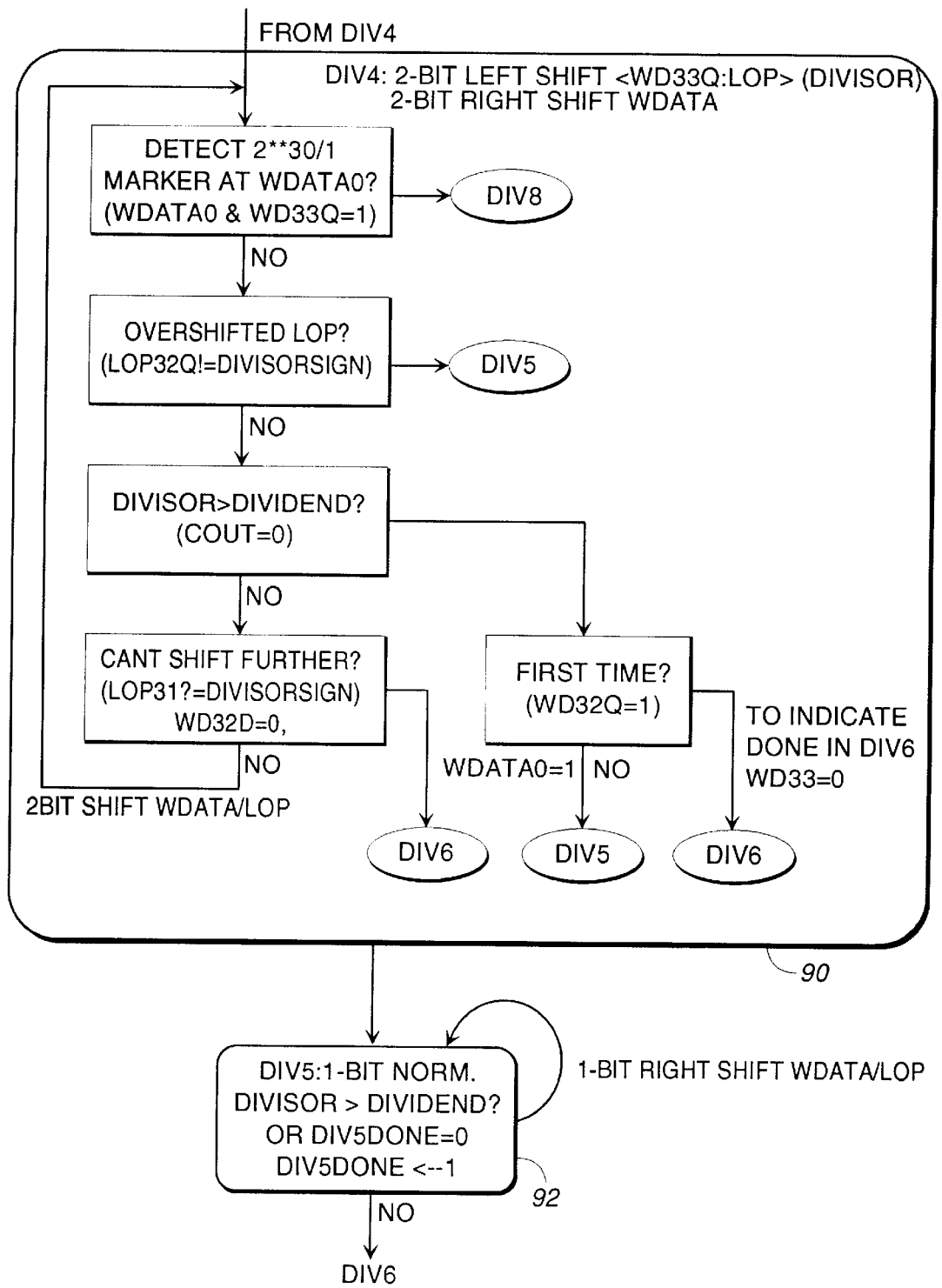
Figure 8:
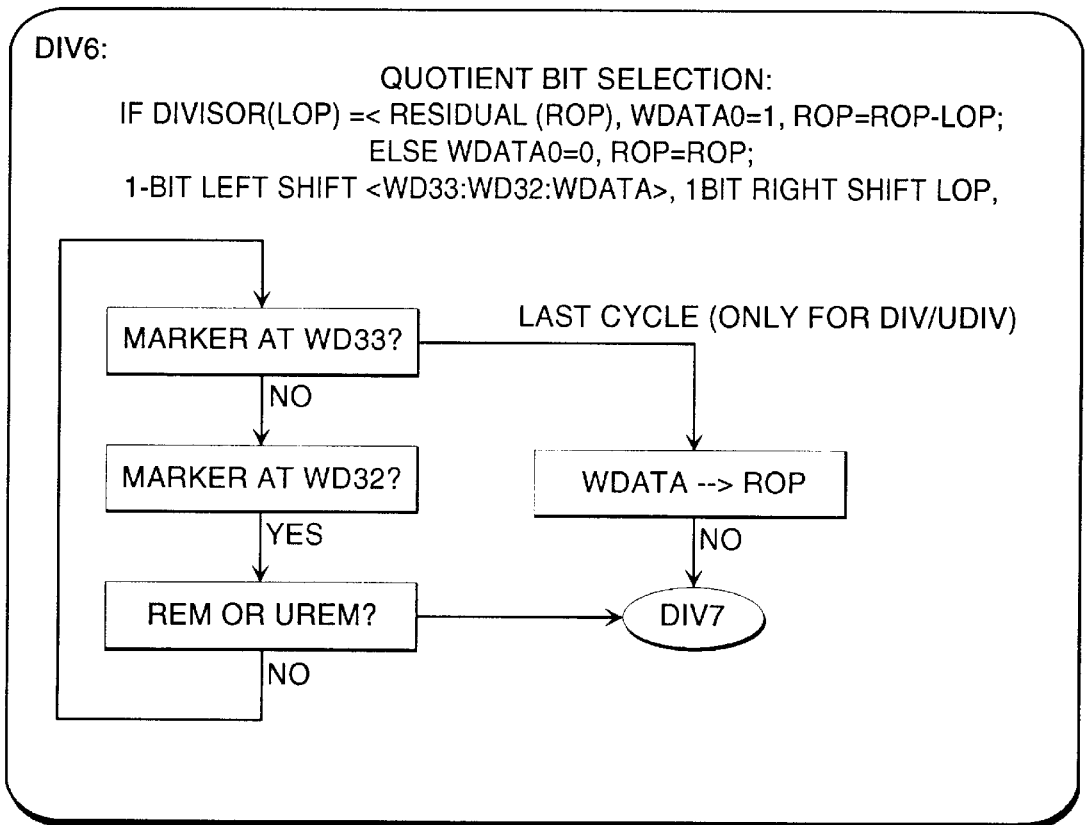
Figure 8:
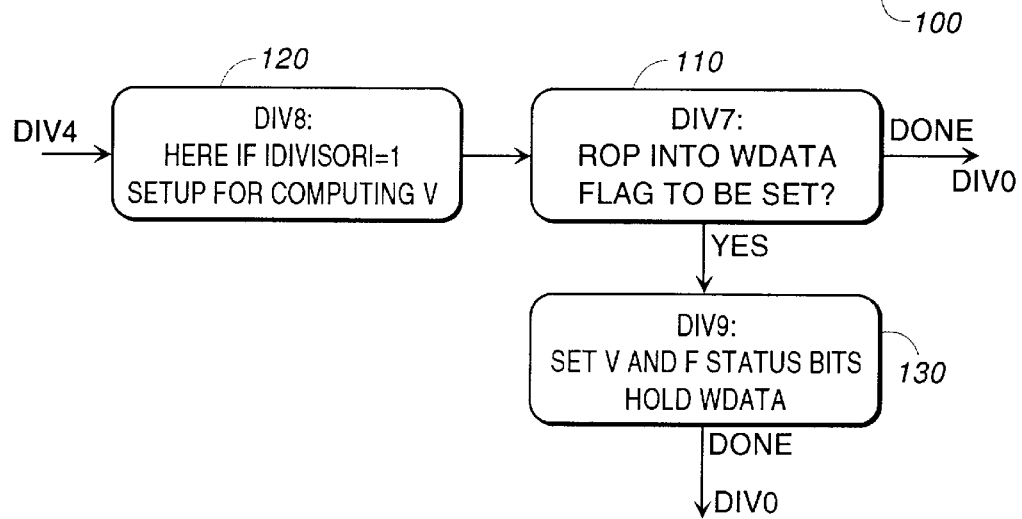

The execute stage datapath of the present invention is controlled by a state machine 70 or sequencer that implements the VD division scheme. The state machine 70 is shown in FIG. 5 and the state diagram for the state machine is shown in FIGS. 6, 7 and 8. FIG. 5 shows the signals and hardware comprising the division state machine. As would be understood, the datapath status signals provide information between the execute stage 16 and the state machine 70, wherein the datapath control signals determine the operation of the execute stage. Some of the datapath control signals are precomputed and latched to improve speed. These signals, for example, aluop, cin, ladmxc, radmxc must be determined 1 clock before they are applied to the datapath. The state machine also reads the instruction which indicates whether the operands are 2's complement (for div, rem instructions) or unsigned (udiv, urem) and whether the required result is the quotient (div, udiv) or remainder (rem,urem). The state machine 70 also indicates via flags 72 the status of the division operation; for example, overflow which occurs when the smallest integer is divided by −1, rzero when the desired result is 0, divby0 when the divisor is 0, and divlc to signal the last cycle of the division operation. The CPU control signals 74 consist of the clock for the flip-flops, a reset and an abort which returns the state machine to its idle state. As can be seen, the state machine 70 is arranged in a usual manner and includes: a state register 76 which stores the current state and combinational logic 78 to compute the next state, auxiliary (temporary) information, the flags and datapath controls. The auxiliary information output from the combinational logic is stored in the auxiliary flip-flops 79.

The division state diagram consists of 9 states. States DIV0, DIV1, DIV2, DIV3 shown in FIG. 6 perform initialization, states DIV4 and DIV5 shown in FIG. 7 perform the alignment, state DIV6 shown in FIG. 8 computes the quotient and the other states prepare the result in WDATA. The default combinational logic outputs are specified below to avoid unnecessary repetition. As would be understood, they are overridden by the specified values in each state. To avoid confusion between input and output, flip-flop names are appended with a q to indicate output (for example, wd32 is an input, wd32q is the current output of the wd32 flip-flop).

Default combinational logic outputs:
  overflow=0; rzero=0; divlc=0; divby0=0; ldlop=0; idrop=0, wd0in=0 , lopmxc=x, ropmxc=x, ldwdata=1, lop31in=0, lop32=lop30, xmxlc=alu, wdmxc=xmxl, wd32=0, wd33=0, divisorsign=nchg, dividendsign=nchg, aluop=add_op, cin=0, ladmxc=zero, radmxc=zero, next_state=DIV0 if abort or reset Referring to FIG. 6, states DIV0–DIV3 are shown for the division state machine 70. DIV0, the initial state is shown in box 80, At this point, the LOP register 20 contains the dividend and ROP register 22 the divisor. The instruction is specified indicating one of four operations: signed division (div), signed remainder (rem), unsigned division (udiv), and unsigned remainder (urem). In addition ldfeqz (load F if result is equal to zero) indicates whether a flag in the processor must be modified based on the result being zero (quotient or remainder). Also, the delayed datapath control outputs are setup by the decode stage as follows: aluop=or_op, cin=x, ladmxc=zero, radmxc=nchg. The main operation in DIV0 is to transfer the divisor from the ROP register 20 to WDATA 24. At this point, the signs of divisor and dividend are stored and, if the dividend is negative (for div and rem only) a setup is made to negate the dividend in DIV1.

In the next state, DIV1(box 82), the LOP register 20 contains the dividend and WDATA 24 the divisor. Here, the dividend, negated if necessary to make it positive, is loaded into the ROP register 22 on a next clock edge, while the divisor is held in WDATA 24. If wdinzeroq=1, this indicates division by zero, which causes the state machine to go to DIV0.

At state DIV2 (box 84), the ROP register 22 contains the (positive) dividend and WDATA 24 the divisor. The divisor is then loaded into the LOP register on a next clock edge, while dividend is held in ROP 22. If wdinzeroq=1, indicating a dividend of zero, the state machine goes to DIV7 since the result is 0.

In state DIV3(box 86), the ROP register 22 contains the (positive) dividend and LOP the divisor. WDATA 24 is initialized to 0, wd32 to 1, wd33 to divisor sign. The ROP and LOP registers are then held and the ALU 38 is set up to perform a LOP-ROP operation in DIV4.

Referring to FIG. 7, the state diagram for DIV4 (box 90) is shown. Here once again the ROP register 22 contains the (positive) dividend and LOP 20 the divisor, and WDATA=0. The ALU 38 will now produce the difference of LOP and ROP. The divisor is shifted left 2 bits per cycle until the divisor>dividend. A marker (a "1" in a field of 0s) in WDATA 24 shifts right 2 bits per cycle to keep track of the number of shifts. Divisor (lop32:LOP) will be shifted 2 bits left, with lop30 going into lop32 which serves as the 33rd bit of LOP during shifting. Next, [wd33:wd32:WDATA] shifts 2 bits right (the 1 in wd32 will shift right into WDATA and serves as a marker). As would be understood, precautions must be taken before each shift.

A shift is not performed if the divisor is already greater than the divisor. This may be true in the first DIV4 cycle, or later as a result of shifting the divisor. If the divisor is greater at the very beginning (before any shift) then the quotient is zero and the remainder is the dividend. In this case, the next state is DIV6, and wdata (quotient) is undisturbed. It must be indicated to DIV6 that quotient is already computed by setting the DIV6 end conditions, wd32=1, and wd33=0. If the divisor is greater than dividend after 1 or more shifts, then the next state is DIV5. Here, div5done=0 to indicate to DIV5 that at least 1 shift must be done in DIV5 (DIV5 uses div5done=1 to quit).

A shift is also not performed if lop31 is not the sign stored in divisorsign. This is because the most significant bit will be lost in the shift. If the divisor is not greater than the dividend, this situation implies that the operands are aligned. Thus the DIV5 alignment is unnecessary and we can go to DIV6 setting wd32 to zero (DIV6 ends if wd32q=1). As would be understood, an overshifted situation can arise after shifting, and this is true if lop32q is not equal to divisorsign. In such a case we proceed to DIV5 where lop31 is restored by shifting back lop32q.

As a result of shifting WDATA 16 times the 1 in wd32 is shifted to wdata0. Thus when wdata0=1 the following is true: original divisor must be −1, 1 or −2. and |dividend|>=230. If the divisor=−2 then lop32q=0. Thus, the simple test for wdata0=1 and lop32q=1 reveals that the original divisor was +1 or −1. Consequently, no division steps are required since quotient=dividend (plus or minus) and remainder=0. Detecting division of values greater than 230 by +/−1 also has the benefit of detecting overflow in division which occurs if the most negative value is divided by −1. If test is true, we proceed to DIV8 shown in FIG. 9, which sets up the datapath to produce the correct values including any overflow indication.

In DIV5 (box 92), the ROP register 22 contains the (positive) dividend and LOP 20 the shifted divisor. The shifted divisor is larger than the dividend, and will be made equal or smaller by 1 or 2 right shifts of LOP 20. The divisor may be overshifted by 1 bit, and will be restored by a 1-bit right shift with lop32→lop31. [wd33q:wd32q:WDATA] contains the marker, which must be left shifted corresponding to LOP.

Referring now to FIG. 8, at DIV6 (box 100), ROP 22 contains the (positive) dividend and LOP 20 the aligned divisor. The aligned divisor is smaller than the dividend such that subtraction yields a residual smaller than divisor. [wd33q:wd32q:WDATA] contains the marker, which must be left shifted corresponding to LOP. The iteration consists of computing the residual, updating ROP with the new residual only if it is positive, and stuffing the quotient bits into WDATA0 (the usual restoring algorithm). The iteration stops when the marker reaches wd32. For DIV and UDIV, one more cycle is necessary to load the quotient in WDATA into ROP. For REM and UREM the result (residual) is already in ROP, and DIV6 ends. The second marker, wd33q is required, so 1 more cycle can be done for DIV and UDIV.

At DIV7 (box 110), the ROP register 22 contains the (positive) quotient or (positive) remainder. This is the last cycle unless ldfeqz=1 indicating that rzero is required. That is, if the previous state was DIV8, then remainder is not in ROP 22, since the remainder is 0. In that case it is generated by adding 0+0 into WDATA. The ALU 38 has already been set up in DIV8, thus, if the previous state was not DIV8, then ROP is negated, if required, and loaded into WDATA. The overflow is checked only if previous state was DIV8 as indicated by vchk=1. Also, as would be understood, for bypassing to work, WDATA must be available at LOP and ROP.

DIV8 (box 120) is reached only if the |divisor|=1 (and dividend >=2**30) was detected in DIV4. Then, the quotient=dividend (in ROP) and remainder=0. This detection reduces 3 cycles from worst-case division time. That is, LOP=1000 . . . 00 and ALU does LOP+ROP→WDATA. Thus, if ROP=1000 . . . 00, then WDATA is 0. This is how overflow is checked. Setup for DIV7 requires the quotient or remainder in ROP. Appendices 1–5 show the pseudo code for each of state diagrams DIV4–DIV8, respectively.

DIV9 (box 130) is reached from DIV7 only if rzero must be set based on a result being zero. This is the last cycle and overflow (checked in DIV7) must also be indicated. For bypassing to work, WDATA must be available at LOP and ROP.

The above-described variable division scheme is advantageous in that the alignment phase for integer division is sped up significantly. That is, for 32-bit 2's complement operands, the scheme has a delay less than a fixed-delay scheme for most operands.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

TABLE 1

LOPMX control

| lopmx | LOPMX Output |
|---|---|
| 1brt | LOP register output shifted right 1 bit with bit_31 set to 0 |
| 2blt | LOP register output shifted left 2 bits with bits 0 and 1 set to 0 |
| dstg | Left Operand value from decode stage |
| xmx1 | Output from XMX1 multiplexer |

TABLE 2

ROPMX Control

| ropmxc | ROPMX Output |
|---|---|
| dstg | Right Operand value from decode stage |
| xmx1 | Output from XMX1 multiplexer |

TABLE 3

LADMX Output

| ladmxc | LADMX Output |
|---|---|
| 1blt | LOP register output shifted left 1 bit with bit_0 set to 0 |
| zero | Output set to 0 |
| cmpl | LOP register output is inverted (1's complement) |
| nchg | LOP register output is fed through unchanged |
| radmxc | RADMX Output |
| zero | Output set to 0 |
| cmpl | ROP register output is inverted (1's complement) |
| nchg | ROP register output is fed through unchanged |

TABLE 4

WDMX Output

| wdmxc | WDMX Output |
|---|---|
| nchg | WDATA register output is fed through unchanged |
| 1blt | WDATA register output shifted right 1 bit with bit_31 set to 0 |
| 2brt | WDATA register output shifted right 2 bits, bits 0 and 1 set to 0 |
| xmx1 | Output from XMX1 multiplexer |

What is claimed is:

1. An apparatus for performing an integer division operation of binary numbers, said apparatus comprising:

a first register for storing a dividend value therein;

a second register for storing a divisor value therein;

a third register for storing a quotient therein, said third register including an n-bit extension at the most significant bits thereof, said third register and said extension defining an extended register, said third register being loadable with a zero value and said extension being presettable to include a given marker value defining a marker;

a digital adder having inputs coupled to said first and second register and having an output coupled to said extended register, said output of said adder being further coupled to said first and second register:

means coupled to said first, second and said extended register for shifting a value stored in said first, second and said extended register, respectively; and control means coupled to said first, second and extended register, said digital adder and said means for shifting, said control means operable to perform alignment of said divisor in said second register with said dividend in said first register through shifts of said value in said second register, wherein said extended register tracks the shifts of said second register during said alignment performing equal shifts in an opposite direction thereof, and wherein the positioning of said marker subsequent to said alignment is indicative of a number of iterations required to produce a desired quotient or remainder for a given dividend and divisor value.

2. The apparatus of claim 1, wherein said second register has a 2-bit left shift capability and said extended register has a 2-bit right shift capability, said control means operable to instruct said second register and said extended register to perform 2-bit per clock cycle shifts during said alignment while said value in said first register is greater than or equal to said value in said second register, and wherein said control means instructs said second and extended register to perform 1-bit correction shifts in an opposite direction following said 2-bits per clock cycle shifts, while said value in said first register is less than said value in said second register, thereby completing alignment for said integer division operation.

3. The apparatus of claim 2, wherein the number of 1-bit shifts is either 1 or 2.

4. The apparatus of claim 1, wherein said second register has a 2-bit left shift capability and said extended register has a 2-bit right shift capability, said control means further operable to shift the value of said second register 2-bits left per clock cycle and the value of said extended register 2-bits right per clock cycle, wherein zeroes replace the shifted bits in said second register and said extended register, the 2-bits per clock cycle shifts of said second register and said extended register continuing until said value in said first register is smaller than or equal to said value in said second register, and wherein following said 2-bits per clock cycle shifts, said control means is operable to shift the value in said second register 1-bit right and the value of said extended register 1-bit left with a zero placed in the least significant bit of said extended register, the 1-bit shifts continuing while said value in said first register is less than said value in said second register, thereby completing alignment for said integer division operation.

5. The apparatus of claim 4, wherein said control means is operable to determine whether a second marker value is present in said extension, wherein if said second marker value is not present in said extension, said control means is operable to shift said second register 1-bit right and said extended register 1-bit left with a 1 replacing the least significant bit of said extended register, if said value in said first register is greater than or equal to said second register, wherein the value of said second register is then subtracted from said first register and the result is placed in said second register;

wherein if the value of said first register is not greater than or equal to said second register, said second register is shifted 1-bit right and said extended register is shifted 1-bit left with a zero placed in the least significant bits thereof, the value of said first register being left intact; and wherein said third register contains the quotient and said first register contains the remainder of said division operation when said second marker value is detected in said extension.

6. The apparatus of claim 5, wherein said second marker value is a "10" binary value.

7. The apparatus of claim 1, wherein said control means is operable to monitor the position of said marker subsequent to said alignment, wherein presence of said marker at a least significant bit position of said extended register is indicative of division of a large number by 1 or −1 defining a worst case delay during said division operation.

8. The apparatus of claim 7, wherein said control means is operable to recognize said worst case delay such that subsequent iterations of a division algorithm need not be performed, thereby reducing said worst case delay.

9. The apparatus of claim 1, wherein said control means is adapted to output signals for clocking shifts of said second and third register.

10. The apparatus of claim 1, wherein said control means is further operable to control completion of a restoring division algorithm.

11. The apparatus of claim 1, wherein said n-bit extension is two bits in length and said marker value is a "01" binary value.

12. The apparatus of claim 1, wherein said first, second and third register are included in an execute stage of an integrated circuit digital processor device.

13. The apparatus of claim 12, wherein said first register is a right operand register and said second register is a left operand register, said left operand register and said right operand register having inputs coupled to a decode stage of said microprocessor, and outputs coupled to an arithmetic logic unit (ALU), said third register being a write data register and having an input coupled to said ALU.

14. The apparatus of claim 1, wherein said apparatus is adapted to perform signed division, signed remainder, unsigned division and unsigned remainder.

15. An integrated circuit including a digital processor device adapted to perform a variable delay integer division operation in an execute stage thereof, said integrated circuit comprising:

a first register for receiving a right operand from a decode stage of said processor;

a second register for receiving a left operand from said decode stage;

an arithmetic logic unit (ALU) coupled to outputs of said first register and said second register for performing addition and subtraction computations, said ALU having an output coupled back to said first and second register;

a third register having an input coupled to an output of said ALU, said third register having an n-bit extension at the most significant bits thereof, wherein said third register and said extension define an extended third register, said third register being loadable with a zero value and said extension being presettable to include a given marker value defining a marker; and a sequencer coupled to said first, second and third register and adapted to control shifting of values stored therein, respectively, said sequencer operable to perform alignment of a divisor in said second register with a dividend in said first register through shifts of said second register, wherein said extended register tracks the shifts of said second register during said alignment performing equal shifts in an opposite direction thereof, wherein the positioning of said marker subsequent to said alignment is indicative of a number of iterations required to produce a desired quotient or remainder for a given dividend and divisor value.

16. The integrated circuit of claim 15, wherein said first register is adapted to perform a 2-bit left shift operation and a 1-bit right shift operation, said extended third register is adapted to perform a 2-bit right shift operation and a 1-bit left shift operation, and said sequencer is operable to instruct said second register and said extended register to perform 2-bit per clock cycle shifts during said alignment while said value in said first register is greater than or equal to said value in said second register, and wherein said sequencer instructs said second and extended register to perform 1-bit correction shifts in an opposite direction following said 2-bits per clock cycle shifts, while said value in said first register is less than said value in said second register, thereby completing alignment for said integer division operation.

17. The integrated circuit of claim 16, wherein the number of 1-bit shifts is either 1 or 2.

18. The integrated circuit of claim 15, wherein said sequencer is operable to monitor the position of said marker subsequent to said alignment, wherein presence of said marker at a least significant bit position of said extended register is indicative of division of a large number by 1 or −1 and a worst case delay during said division operation.

19. The integrated circuit of claim 18, wherein said sequencer is operable to recognize said worst case delay such that subsequent iterations of a division algorithm need not be performed, thereby reducing said worst case delay.

20. The integrated circuit of claim 15, wherein said first register is adapted to perform a 2-bit left shift operation and a 1-bit right shift operation, said extended third register is adapted to perform a 2-bit right shift operation and a 1-bit left shift operation, said sequencer being operable to shift a divisor value of said second register 2-bits left per clock cycle and the value of said extended third register 2-bits right per clock cycle, wherein zeroes replace the shifted bits in said second register and said extended third register, the 2-bits per clock cycle shifts of said second register and said extended third register continuing until said value in said first register is smaller than or equal to said value in said second register, and wherein following said 2-bits per clock cycle shifts, said sequencer is operable to shift the value in said second register 1-bit right and the value of said extended register 1 bit left with a zero placed in the least significant bit of said extended register, the 1-bit shifts continuing while said value in said first register is less than said value in said second register, said sequencer thereby completing alignment for performance of said integer division operation.

21. The integrated circuit of claim 15, wherein said sequencer is further operable to control completion of a restoring division algorithm.

22. The integrated circuit of claim 15, wherein said n-bit extension is two bits in length and said marker value is a "01" binary value.

23. The integrated circuit of claim 15, wherein said sequencer includes combinational logic said combinational logic operating on:
- a datapath status input for receiving datapath status signals from said execute stage;
- an instruction input for determining whether the operands are 2's complement or unsigned and whether a required result is a quotient or remainder;
- a CPU control input for receiving CPU control signals, wherein said combinational logic is operable to provide:
- a datapath control output for determining operation of said execute stage;
- a flag output for providing the status of said division operation via flags, said combinational logic also operable to produce a next state output for said sequencer and temporary information for use in said division operation.

24. The integrated circuit of claim 23, wherein said sequencer further includes memory devices for storing said temporary information and said next state.

25. A method for performing variable delay integer division of a binary number in a digital processor device, said method comprising the steps of:
- loading a dividend value in a first register
- loading a divisor value in second register;
- initializing a third register to zero and loading a predetermined marker value defining a marker into an n-bit extension of said third register at the most significant bits thereof, said third register and said extension defining an extended register said digital processor including a digital adder having inputs coupled to said first and second register and having an output coupled to said extended register, said output of said adder being further coupled to said first and second register, said processor including means coupled to said first, second and said extended register for shifting a value stored in said first, second and said extended register, respectively; and
- aligning said divisor in said second register with said dividend in said first register through shifts of said second register, wherein said extended register tracks the shifts of said second register during said alignment, thereby performing equal shifts in an opposite direction thereof, wherein the positioning of said marker subsequent to said alignment is indicative of a number of iterations required to produce a desired quotient or remainder for a given dividend and divisor value.

26. The method of claim 25, wherein said second register has a 2-bit left shift capability and said extended register has a 2-bit right shift capability, further including the steps of:
- performing 2-bit per clock cycle left shifts in said second register and 2-bit per clock cycle right shifts in said extended register during said alignment while said value in said first register is greater than or equal to said value in said second register, and
- performing 1-bit correction shifts in an opposite direction at said second and extended register following said 2-bits per clock cycle shifts, while said value in said first register is less than said value in said second register, thereby completing alignment for said integer division operation.

27. The method of claim 25, further including the step of:
- monitoring the position of said marker subsequent to said alignment, wherein presence of said marker at a least significant bit position of said extended register is indicative of division of a large number by 1 or −1 and a worst case delay during said division operation.

28. The method of claim 27, wherein said processor is operable to recognize said worst case delay such that subsequent iterations of a division algorithm need not be performed, thereby reducing said worst case delay.

29. The method of claim 25, further including the steps of
- shifting the value of said second register 2-bits left per clock cycle and the value of said extended register 2-bits right per clock cycle, wherein zeroes replace the shifted bits in said second and said extended register and the shifts of 2 bits left and 2 bits right continue until said value in said first register is greater than or equal to said value in said second register, and
- shifting the value in said second register 1 bit right and the value of said extended register 1 bit left with a zero placed in the least significant bit of said extended register while said value in said first register is less than said value in said second register, thereby completing alignment for said integer division.

30. The method of claim 25 further including the step of performing a restoring division algorithm using the values in said first, second and third register.

31. The method of claim 25, wherein said n-bit extension is two bits in length and said marker value is a "01" binary value.

32. The method of claim 25, wherein said first register is a right operand register and said second register is a left operand register, said left operand register and said right operand register having inputs coupled to a decode stage of said microprocessor, and outputs coupled to an arithmetic logic unit (ALU), said third register being a write data register and having an input coupled to said ALU.

* * * * *